United States Patent [19]
Hetzler et al.

[11] Patent Number: 5,202,799
[45] Date of Patent: Apr. 13, 1993

[54] LOGICAL DATA TRACKS EXTENDING AMONG A PLURALITY OF ZONES OF PHYSICAL TRACKS OF ONE OR MORE DISK DEVICES

[75] Inventors: Steven R. Hetzler, Sunnyvale; Jaishankar M. Menon; Michael F. Mitoma, both of San Jose, all of Calif.

[73] Assignee: IBM Corporation, Armonk, N.Y.

[21] Appl. No.: 719,379

[22] Filed: Jun. 24, 1991

[51] Int. Cl.$^5$ .............................................. G11B 5/09
[52] U.S. Cl. ................................................... 360/48
[58] Field of Search ............... 360/48, 40; 395/278, 395/400

[56] References Cited

U.S. PATENT DOCUMENTS

| | | | |
|---|---|---|---|
| 4,016,603 | 4/1977 | Otteson | 360/135 |
| 4,223,909 | 9/1980 | Bowers et al. | 364/900 |
| 4,432,025 | 2/1984 | Grogan | 360/48 |
| 4,680,653 | 7/1987 | Ng et al. | 360/72.2 |

OTHER PUBLICATIONS

Patterson et al "A Case for Redundant Arrays of Inexpensive Disks (RAID)", ACM 1988, Mar. 1988, pp. 109-116.

Primary Examiner—Vincent P. Canney
Attorney, Agent, or Firm—Herb Somermeyer; R. Bruce Brodie

[57] ABSTRACT

One or more data-storing disk devices support logical tracks extending between radial recording zones of tracks in the device(s). Each data-storing disk in the device(s) is formatted into a plurality of radial recording zones of physical tracks, each radial recording zone having a like number of physical tracks, each physical track may be one circumvolution of a single spiral track. The physical tracks in the respective recording zones store a different number of data bytes. Each logical track including a plurality of said physical tracks; at least one of the physical tracks in each of the logical tracks is in a different one of the radial recording zones in different ones of the devices or in a single device. Described are an extended logical track and extended logical cylinder accessing methods and apparatus. Not all of the physical tracks of any of the devices or recording zones need be a member of any logical track.

31 Claims, 5 Drawing Sheets

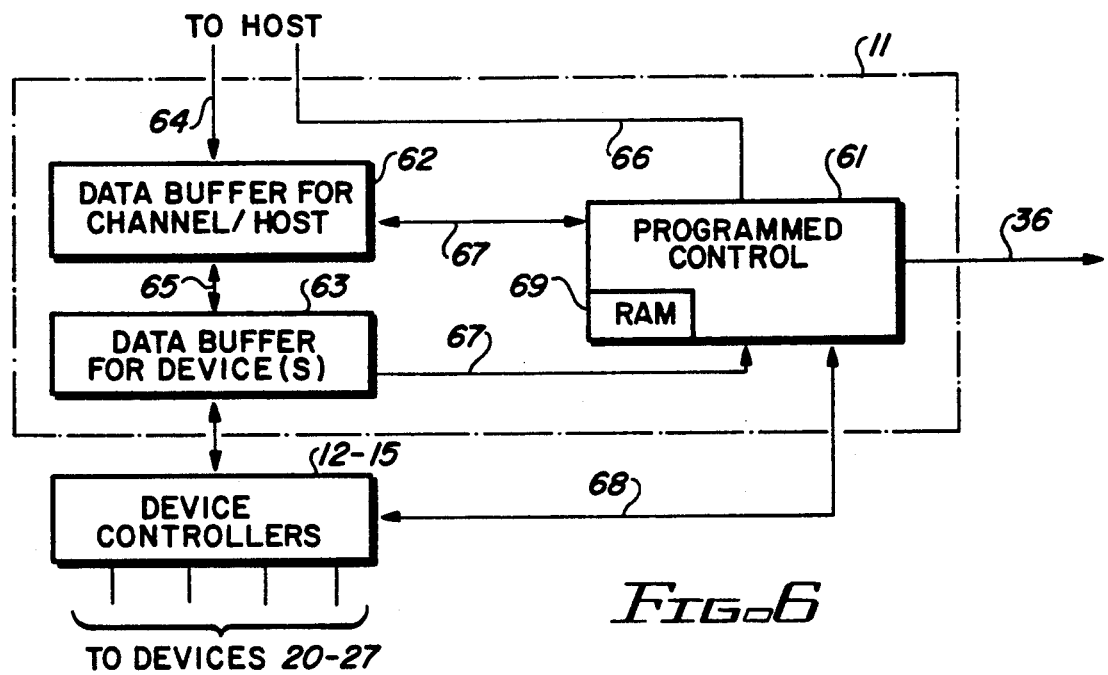
FIG. 6
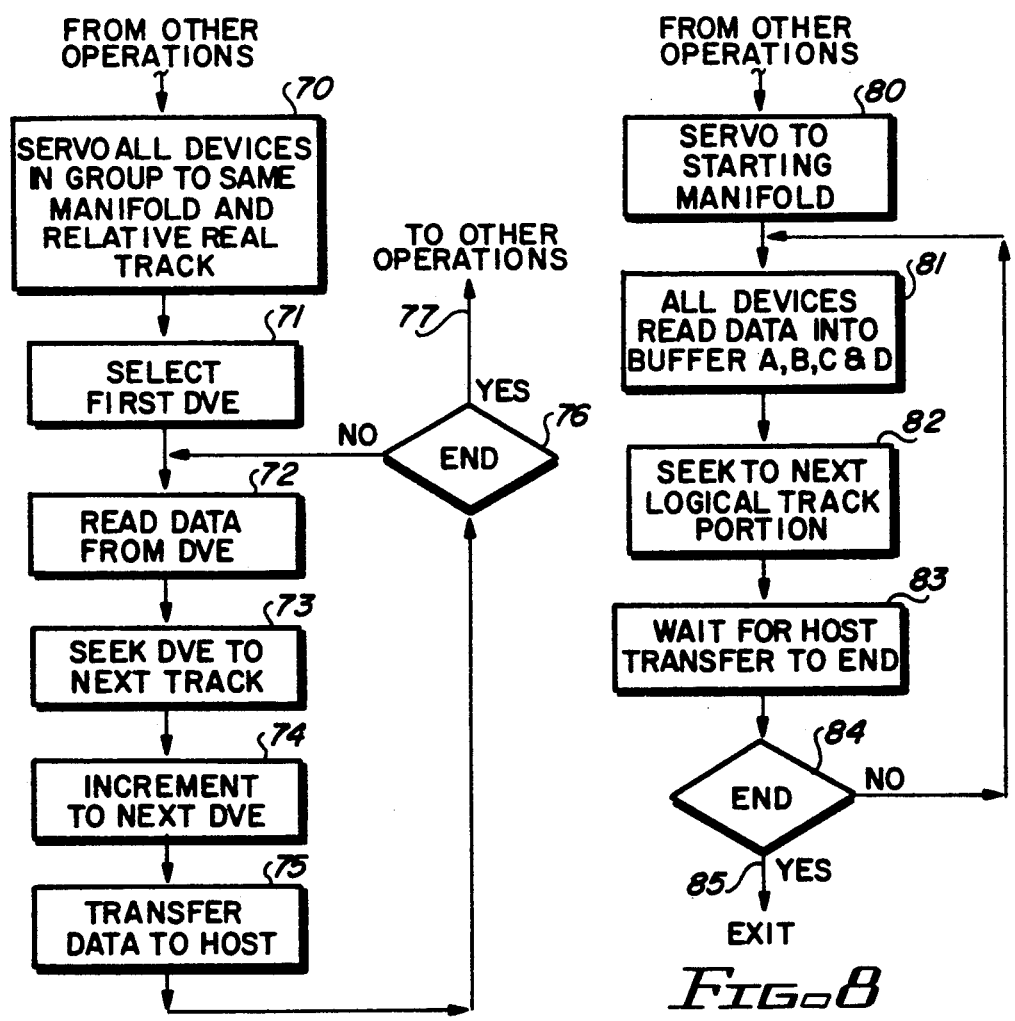
FIG. 7
FIG. 8

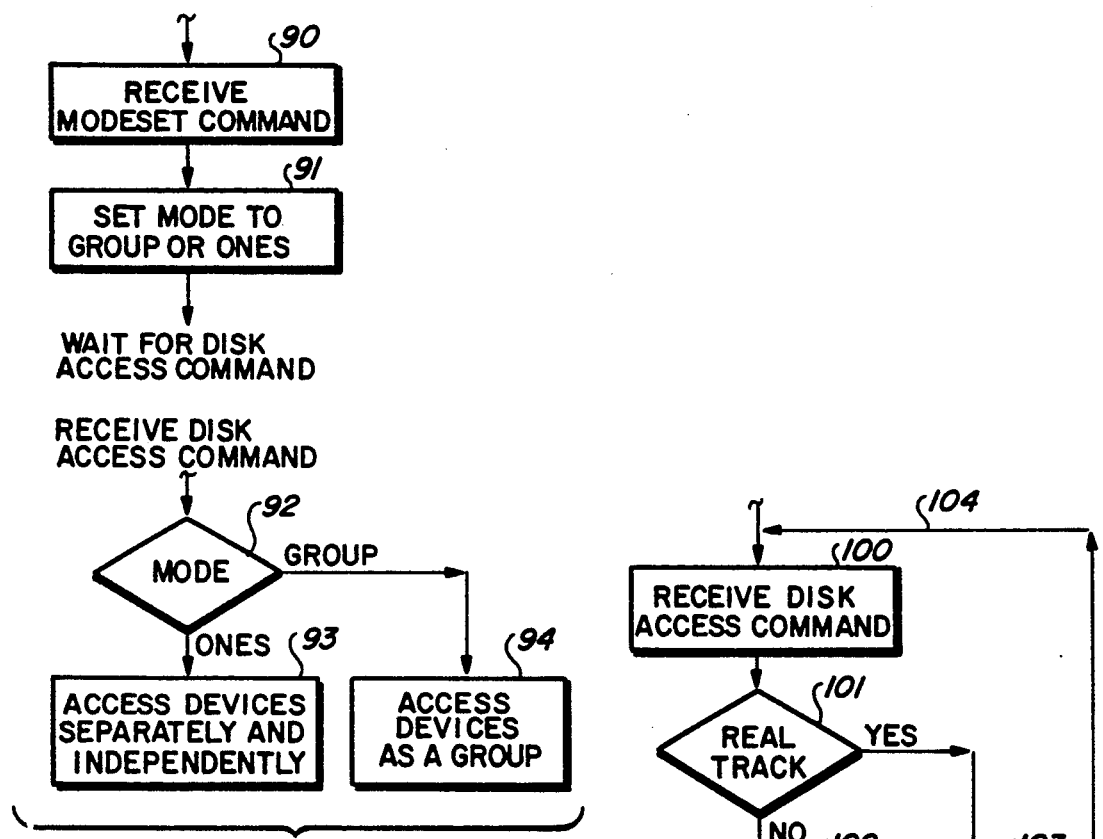
Fig. 9
Fig. 10
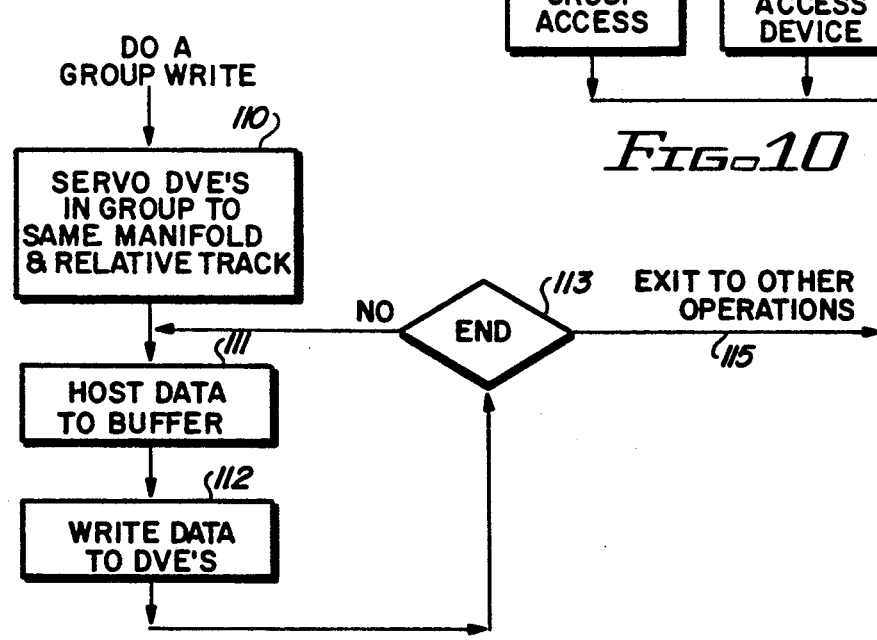
Fig. 11

LOGICAL DATA TRACKS EXTENDING AMONG A PLURALITY OF ZONES OF PHYSICAL TRACKS OF ONE OR MORE DISK DEVICES

FIELD OF THE INVENTION

The present invention relates to data storing systems, more particularly to data storing systems providing a logical track from a plurality of spaced apart physical tracks.

BACKGROUND OF THE INVENTION

Computer storage of data on direct access data storage devices (DASD) has been employed for many years. Initially, all related data were stored on a single device. Sometimes, of course, when the single device became full, a second device received the overflow data. Another approach to disk data storage is the so-called RAID arrangement. Patterson et al in an article "A CASE FOR REDUNDANT ARRAYS OF INEXPENSIVE DISKS (RAID)" in ACM 1988 on pages 109-116 (March 1988) set forth arguments for distributing related data over a plurality of devices. The main theme of the article relates to mean time to failure (MTTF) with some discussion on performance. Four "levels" of RAID are described. A first level is merely two sets of devices, each set containing a mirror image of the data stored in the other device set. A second level adds the Hamming or parity based error detection and correction codings (ECC). In this arrangement, all data stored in all of the individual disks have to be read before a write operation; the entirety of the data has to be rewritten, whether necessary or not for other operations. The article states that this level has limited application. In a third level a so-called "check" device is provided in a group of the devices. Each time data are written, the check device has to be updated. A plurality of devices store respective portions of data and a single device stores parity information (error detection redundancy) derived from corresponding data stored in the plurality of devices. All the plurality of devices are read out in parallel into a controller of some sort. An ECC redundancy is calculated for each transfer for storage on the check disk. A last and fourth level provides for independent reads and writes from and to the devices in a RAID grouping. Additionally there is a check disk. Each data transfer unit is accessed as a single sector. The ECC redundancy information is calculated over a portion of each data transfer unit. All of the devices are identical and each portion of a transfer unit is stored in the respective devices at the same relative address within each device. Accordingly, all portions of the data transfer unit have identical data transfer rates.

Data storing capacity of each disk in a device is determined by the maximal data rate at a radially outwardmost track, the maximum data storage density at a radially inwardmost data storing track, or a combination of the considerations. To increase the data storing capacity of DASD, so-called zoned disks are used. Otteson in U.S. Pat. No. 4,016,603 shows a four-zone disk for use in so-called fixed-block architecture devices (FBA devices). The count-key-data (CKD) format programming support requires addressable tracks to have a constant data storing capacity, such capacity is also referred to as "track length" even though the physical track length varies with radius, the data storing capacity in bytes of all the tracks in a disk is constant. In multi-zoned disks, the track data-storing capacity is constant within each zone but increases in capacity in outer radial zones. It is desired to used CKD formats in multi-zoned disks, particularly in a group of multi-zoned disks which may be located in one or more disk devices. All CKD format "tracks" must have the same data-storing capacity irrespective of which of the zones are involved in storing CKD formatted data. This arrangement must provide short access times to all portions of the CKD track of data.

The quantity of data desired to be stored as one addressable track of data has been continuously increasing. This desire, inter alia, has resulted in the so-called "cylinder mode" of disk data storage area accessing. A cylinder in a data disk device are all of the data tracks located at the same radial position. In a DASD having eight disks, there are 15 surfaces for the data tracks and one servo surface. Of course, known sector servo techniques can be employed so that an eight disk DASD will have 16 data storing surfaces. In any event, the accessing mechanism for such DASD is a comb head assembly which has one head or transducer for each of the 16 surfaces. All tracks being simultaneously scanned are at the same radial position and constitute a cylinder of physical tracks. Switching accessing between physical tracks in any one cylinder is by merely electronically switching different ones of the transducers to read/write circuits of the DASD. The cylinder mode takes advantage of this electronic speed switching to create a single logical track consisting of all physical tracks in a given cylinder of physical tracks. It is also desired to extend the cylinder mode to include physical tracks in more than one cylinder of tracks without sacrificing access performance, i.e. without creating a longer access time to the data. This data storing area access enhancement is termed "extended cylinder mode".

SUMMARY OF THE INVENTION

It is an object of the present invention to use multi-zoned data-storing disk apparatus for extending addressable logical track data-storing capacity while preserving data access performance.

In apparatus for storing data in a plurality of spaced-apart physical tracks in a first predetermined number of disk data storage devices means are provided for emulating a constant length logical track on one or more disk devices, each of the disk devices having recording zones. Each of the recording zones have physical tracks having different data-storing capacities and data transfer rates. Each of the zoned disk devices have one or more disk recording surfaces. Each surface has a second predetermined number of recording zones, the recording zones having a like number of addressable data-storing physical tracks. The physical tracks in any zone store a like-number of data bytes, the physical tracks in different zones storing a different number of data bytes. A radially outwardmost zone has physical tracks storing a maximal number of data bytes; zones of decreasing radial positions respectively having physical tracks storing fewer data bytes. In an extended track mode, manifold means connected to said each device establishes a given plurality of groups of predetermined ones of the physical tracks as one logical track. It is preferred that each logical track include a physical track residing in recording zones at different radii; also each recording zone can be in a different one of the devices. The invention may be practiced using any combination of recording zones and devices, including a single device.

In another aspect of the invention, cylinders of tracks ar logically interrelated to provide a logical track consisting of data from cylinders of tracks in an extended cylinder mode.

The foregoing and other objects, features, and advantages of the invention will be apparent from the following more particular description of preferred embodiments of the invention, as illustrated in the accompanying drawings.

DESCRIPTION OF THE DRAWINGS

FIG. 6 is a simplified block diagram of an array controller usable in the FIG. 1 illustrated system.

FIG. 7 is a simplified machine operations chart showing the control of continuous scanning of a plurality of logical tracks in the FIG. 1 illustrated system.

FIG. 8 is a simplified machine operations chart showing a second scanning procedure usable with the FIG. 1 illustrated system and which employs the present invention.

FIG. 9 is a simplified machine operations chart on mode setting the FIG. 1 illustrated system.

FIG. 10 is a simplified machine operations chart showing mode selection of operations based upon analyzing a received disk access command.

FIG. 11 is a simplified machine operations chart showing writing data to a logical track of the FIG. 1 illustrated system.

DETAILED DESCRIPTION

Figure 1:
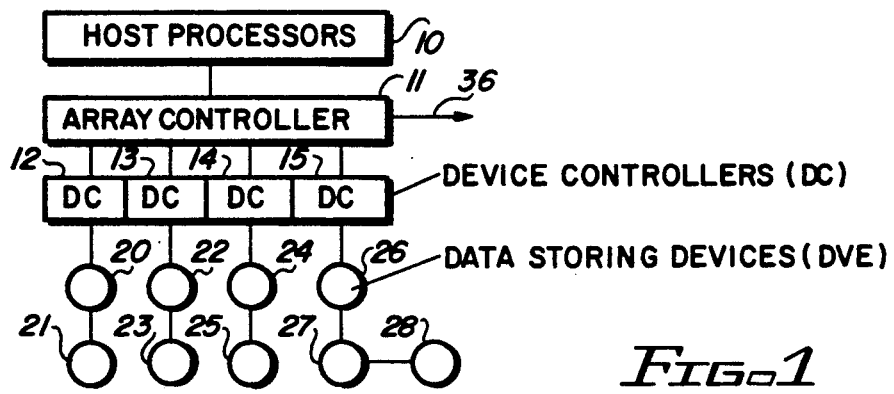
FIG. 1 is a simplified block diagram of an information handling system employing the present invention.

Referring now more particularly to the appended drawing, like numerals indicate like parts and structural features in the various figures. An information handling system employing the present invention includes a programmed host processor 10 (FIG. 1) connected to a programmed array controller 11. Both processor 10 and controller 11 include programs for effecting a multitude of machine operations, including the novel machine operations for practicing the present invention. Collectively, the programmed processor 10 and controller 11 are considered as computer means which contains and executes programming which effects the machine operations described herein. The bulk of such programming may be located in either the processor, controller or split between the two units. Controller 11 is connected to a plurality of device controllers DC 12–15; each of the device controllers 12–15 are respectively connected to data-storing disk devices 20–27 as best seen in FIG. 1. The even numbered devices 20, 22, 24 and 26 constitute a first device group in which the present invention is advantageously employed. The odd numbered devices 21, 23, 25 and 26 constitute a second independent device group in which the present invention is advantageously employed simultaneously with machine operations of the first device group. Device 28, as best seen in FIG. 5B shows a practice of the present invention in a single device. Operations employing the present invention may be time-sliced between disk accessing and control operations such that maximum control and efficiency of the FIG. 1 illustrated system may be achieved. Of course, such a mix of operations is highly dependent on applications and operating environments beyond the scope of the present description.

Figure 2:
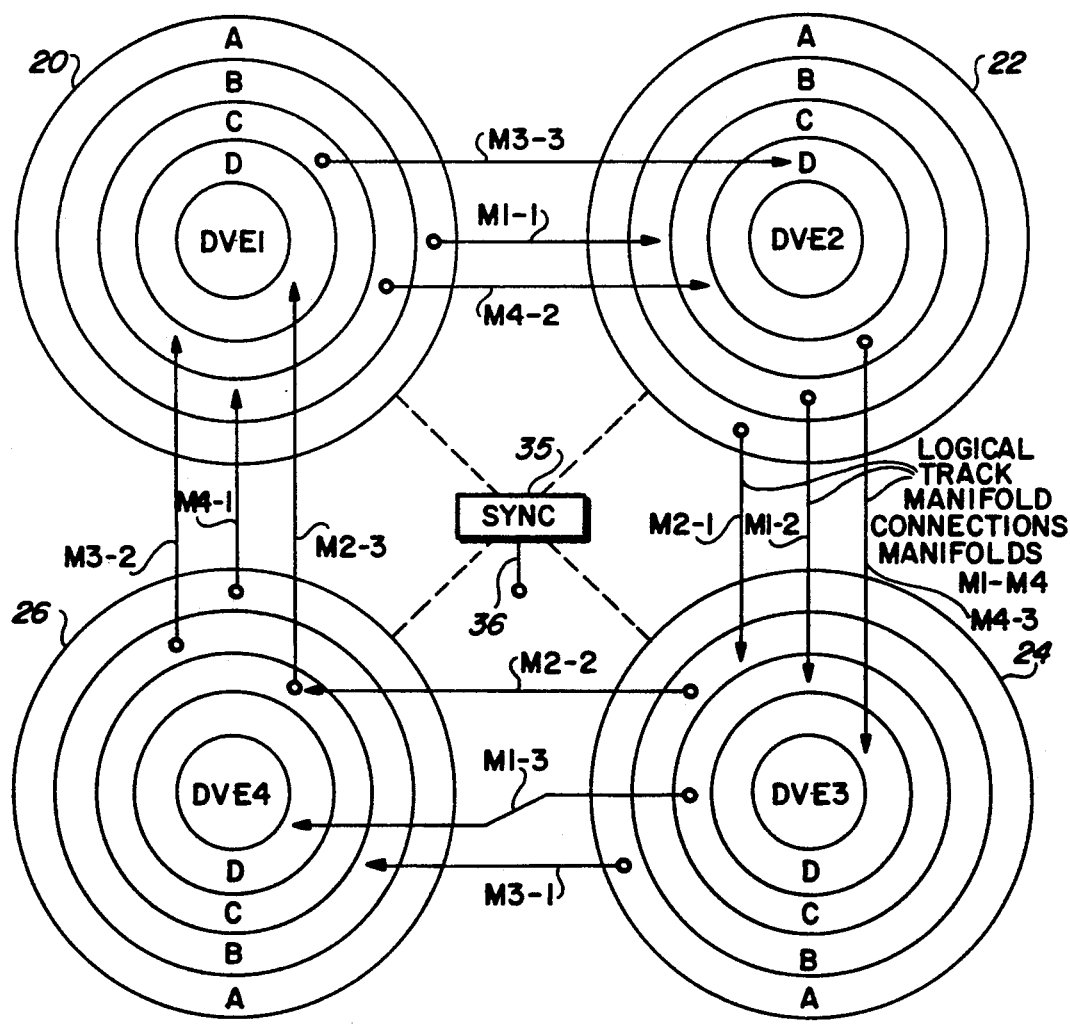
FIG. 2 is a schematic showing of an illustrative embodiment of the present invention as used in the FIG. 1 illustrated system.

FIG. 2 diagrammatically illustrates accessing constant length logical tracks while practicing the present invention in an extended track mode. The principles are applicable to an extended cylinder mode as described later with respect to FIG. 5A. While four disk devices DVE1 20, DVE2 22, DVE3 23 and DVE4 24 are shown, any number of devices may be used, including a single device, as shown in FIG. 5B. All of the disk recording surfaces of each device are divided into four recording zones, A–D. Zone A is a radially outwardmost recording zone and includes physical tracks for storing data having the greater data-storing capacity, i.e. each track stores a maximal number of data bytes. Such data storing capacity is also referred to as track length; while the physical track lengths of zone A have greater lineal dimensions than tracks in zones B–D, length is also equated to data storing capacity assuming that lineal data densities are adjusted to be relatively constant between the various zones. Zone D is the radially inwardmost zone and has the shortest length physical tracks each with the least data-storing capacity of any recording zone on the recording disks of devices having zoned recording.

According to one aspect of the invention, constant-length logical tracks are effected by logically and physically connecting physical tracks of all four devices such that each logical track includes one physical track from each of the four zones. Of course, any number of devices and zones may be used. As will become apparent, it is preferred that the number of devices is never more than the number of zones. The logical tracks are grouped into manifolds of logical tracks, each of the manifolds effecting logical tracks beginning at respective ones of the devices; manifold 1 (M1) tracks all begin in device 20, manifold 2 (M2) tracks all begin in device 22, manifold 3 (M3) tracks all begin in device 24 and manifold 4 (M4) tracks all begin in device 26.

In the embodiment shown in FIG. 2, the number of physical tracks in each of the recording zones used in the respective manifolds is equal; the number of logical tracks extending over the four devices equals the number of physical tracks assigned to the manifolds in each and every one of zones multiplied by the number of recording zones in each of the devices. As used hereinbelow and explained further later with respect to FIG. 5A, the term track is intended to include a cylinder of tracks, i.e. as known, a plurality of physical tracks on respective recording surfaces all having the same radial position.

Manifold M1 tracks all begin in recording zone A of device 20, i.e. the first portion of the M1 tracks is the physical tracks in zone A of device 20. Programming in the computer means logical and physically controls the device controllers 12–15 to connect each of the device 20 zone A tracks to respective physical tracks in zone B of device 22 as a continuation of the M1 logical tracks all as represented by line M1-1, i.e. the first inter-device connection of manifold M1 logical tracks. This logical and physical connections continue from device 22 zone B over connection M1-2 to zone C of device 24 thence over connection M1-3 to zone D of device 26. Accordingly, each logical track in manifold M1 has a length which is the sum of the physical track lengths in zones A-D respectively in devices 20, 22, 24 and 26. The other manifolds are similarly constructed and controlled as set forth in Table 1 below:

TABLE 1

| MANIFOLD NUMBER | START ZONE A DEVICE | CONN | SECOND ZONE B DEVICE | CONN | THIRD ZONE C DEVICE | CONN | LAST ZONE D DEVICE |
|---|---|---|---|---|---|---|---|
| M1 | DVE1 | M1-1 | DVE2 | M1-2 | DVE3 | M1-3 | DVE4 |
| M2 | DVE2 | M2-1 | DVE3 | M2-2 | DVE4 | M2-3 | DVE1 |
| M3 | DVE3 | M3-1 | DVE4 | M3-2 | DVE1 | M3-3 | DVE2 |
| M4 | DVE4 | M4-1 | DVE1 | M4-2 | DVE2 | M4-3 | DVE3 |

In Table 1 A-D indicate the zones used in the respective devices DVE1-DVE4, CONN indicates the logical and physical connections between the indicated devices for creating the logical tracks and the labels "START", "SECOND", "THIRD" and "LAST" respectively indicate the first, second, third and last physical track in each logical track of the respective manifolds M1-M4. All logical tracks start in all manifolds with the longest available physical track, no limitation thereto intended. It should be also noted that the physical tracks remain addressable as in the prior art such that any portion of any logical track residing on any of the devices may be accessed without accessing the entirety of the logical track. Such disk track accessing operations may follow the prior art disk track accessing. All of the logical tracks in all four manifolds have the same data-storing capacity and the same physical lengths creating desired constant-length tracks as used in the known count, key, data (CKD) formatted data disks. In this manner, the logical tracks created by practicing the present invention are advantageously employed as CKD tracks.

When a single device 28 as shown in FIG. 5B is to contain all of the logical tracks, than the recording zone sequence includes a plurality of the recording zones of the single device. For example, single device 28 having four radially displaced recording zones A, B, C and D may include logical tracks consisting of a plurality of the physical tracks in recording zone sequences such as ABCD, BCDA, AB, DA, BC, etc wherein A is the radially outwardmost recording zone and D is the radially inwardmost recording zone. FIG. 5B shows the zone sequence ABCD for creating one manifold in single device 28 by track seeking moves MS-1 from zone A to zone B, MS-2 from zone B to zone C, MS-3 from zone C to zone D and MS-4 from zone D to zone A. In the first sequence ABCD of serially accessing the zones, a first or radially outwardmost track in each of the four zones is accessed, in a second sequence of track scanning the penultimate radially outwardmost physical track in each zone is accessed, etc. Other combinations of physical track accessing may be employed and more than one manifold may be created using the sequence ABCD or other sequences of zones. Any combination of recording zones may be used.

In either the multi-device or single device embodiment, the logical track lengths may be of different lengths. If it is desired to have all logical tracks be the same length (the preferred embodiment), then, for example, one physical track from each of the four zones can be a sole definition of a logical track. A logical track may be limited to a plurality of physical tracks from less than all of the recording zones in the single device, such as zones B and C. As used in this paragraph, the term physical track is intended to include a cylinder of tracks.

For obtaining optimum performance, it is desired that the rotation of the disks in devices DVE1-DVE4 be synchronized such that the respective transducers (not shown) begin scanning the respective physical tracks at their respective index positions (not shown) at about the same time. Such synchronizing is accomplished by sensing the known servo disk surfaces of the four devices and adjusting drive motor operations to synchronize rotational positions of the disks in the devices such that all transducers respectively scan the respective index marks. To this end, synchronizing circuit means SYNC 35 is operatively connected to the disk drive motors of the four devices as indicate by the dashed lines for such synchronization. Array controller 11 automatically determines when such synchronization is desired; controller 11 then activates SYNC 35 by a suitable signal supplied over line 36. Since synchronizing a plurality of devices to effect disk rotation as described above is known, details of such synchronization are not described herein. The invention may be practiced without the synchronization such as by using the well-known "roll mode" of disk track accessing. Such roll mode accessing is applicable to each separate physical track and to a cylinder of such tracks during the so-called cylinder mode. Hartung et al in U.S. Pat. No. 4,483,166 describe a cylinder roll-mode for DASD in a cached-controller environment. The roll mode described therein can be employed on the physical and logical tracks while practicing the present invention whenever the device disk rotations are not fully synchronized.

Figure 3:
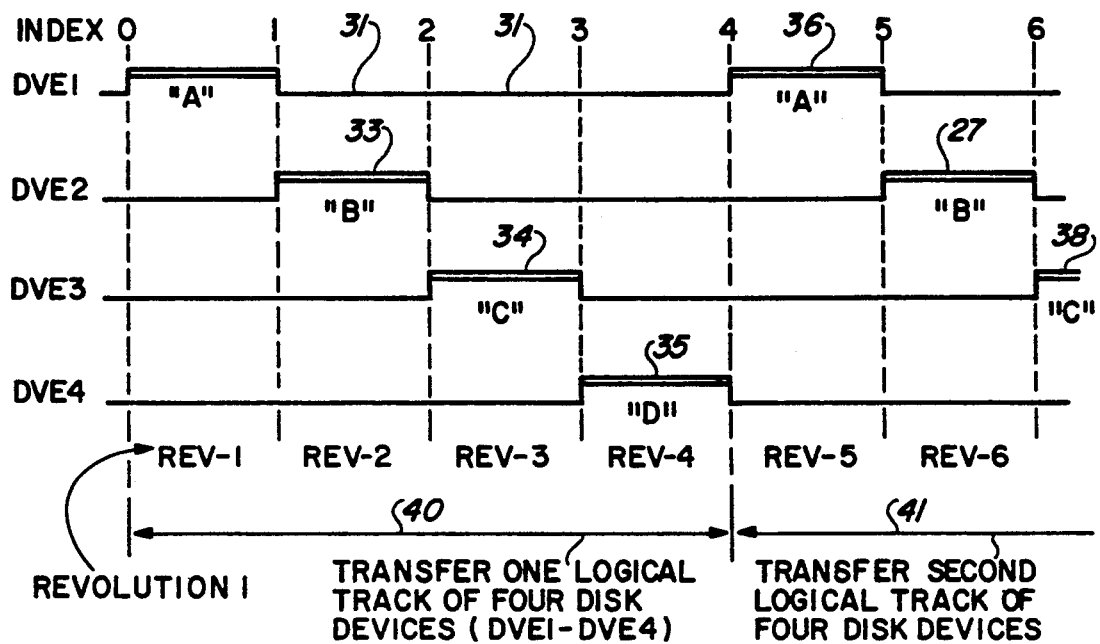
FIG. 3 is a timing diagram illustrating continuously scanning a plurality of logical tracks in the FIG. 1 illustrated system.

In certain disk accessing operations, it is desired to continuously scan a plurality of CKD tracks. When practicing the present invention, such continuous scanning can be achieved without the cost or delays associated with disk rotation. FIG. 3 illustrates the timing of such continuous scanning of one or more logical tracks by serially scanning the four physical tracks which constitute one logical track. The term index indicates the number of passes or scans of the rotating disk used in the plural track scan. The operation of each of the four devices DVE1-DVE4 is indicated on separate graph lines of FIG. 3. The number of disk rotations or revolutions is indicated by REV-1 etc. Number 40 indicates that one logical track is scanned in four disk rotations, one rotation for scanning each of the physical tracks. Numeral 30 denotes scanning a first physical track in zone A of DVE1; the dual line indicates a data transfer is occurring. At vertical line 1, the index of all devices is passed. At this time, data transfer switches electronically from the zone A DVE1 track to the zone B DVE2 track of the logical track being scanned. Numeral 31 indicates that during scanning the zone B DVE2 and zone C DVE 3 physical tracks, DVE1 moves its transducer (not shown) radially to a next track in zone A of DVE1 in preparation to read the beginning of a next logical track, as indicated by numeral 41. At vertical line 2, data transfer is electronically switched from zone B of DVE2 to the zone C DVE3 physical track of the logical track being scanned. After the indexes are passed at vertical line 2, DVE2 moves its transducer (not shown) to its physical track which is a member of the next logical track to be scanned. This operation is repeated for all four devices; scanning the next logical track begins merely by electronically switching data transfer from zone D of DVE4 to zone A of DVE1. The scanning cycle repeats until all desired logical tracks are scanned. Note there is no latency delay in any of the scanning. Examination of FIG. 3 shows that the roll mode can be used in this type of successive track scanning. It is desired that the rotational speed of the four devices be synchronized.

Figure 4:
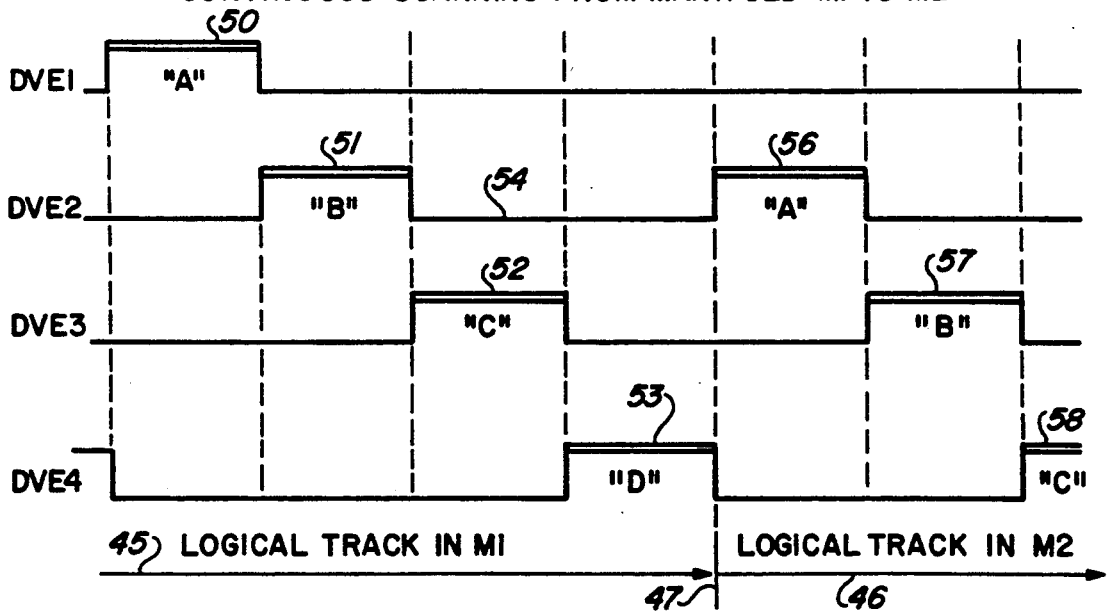
FIG. 4 is a timing diagram illustrating continuous scanning of logical tracks as the scanning moves from one manifold of tracks to a second manifold of tracks of the FIG. 1 illustrated system.

FIG. 4 illustrates the timing of disk operations used to stop scanning physical or logical tracks in one manifold and begin scanning physical or logical tracks in a second manifold Data transfers 50-53 represent transferring data from a last logical track in M1 at numeral 45. Onset of scanning a logical track in manifold M2 begins at vertical line 47 and continues in M2 as indicated by arrow 46. In preparation for scanning in M2, DVE2 at numeral 54 switches to a first track to be scanned in its zone A; such track switching (seeking) is usually accomplished in one disk rotation such that at vertical line 47, DVE2 has its transducer (not shown) faithfully following a first physical track to be scanned in zone A. At time 56, DVE2 effects data transfer from such first track of its zone A. At time 57, DVE3 continues the data transfer, etc as described for FIG. 3. In the manifold switching, DVE2-DVE4 have two disk rotations to seek to their respective zones to be next scanned while DVE1 has six disk rotations before it transfers data from its zone D in M2.

Figure 5A:
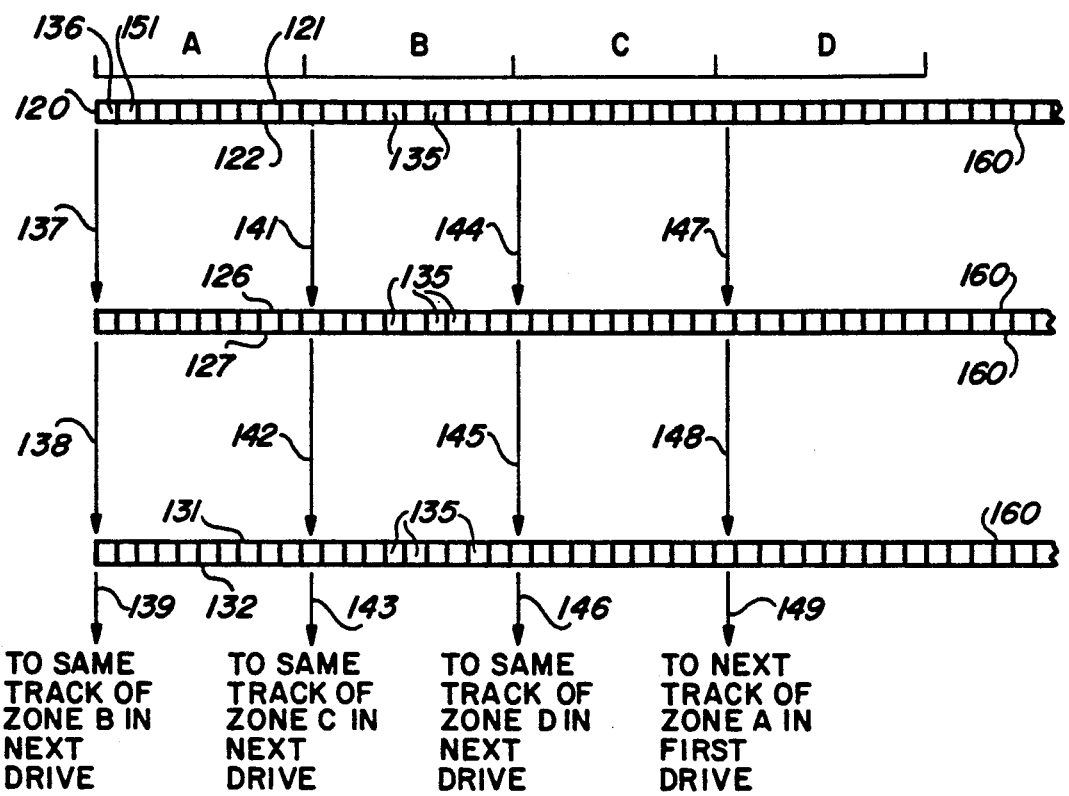
FIG. 5A is a diagrammatic showing of extended cylinder mode operations in the FIG. 1 illustrated system.
Figure 5B:
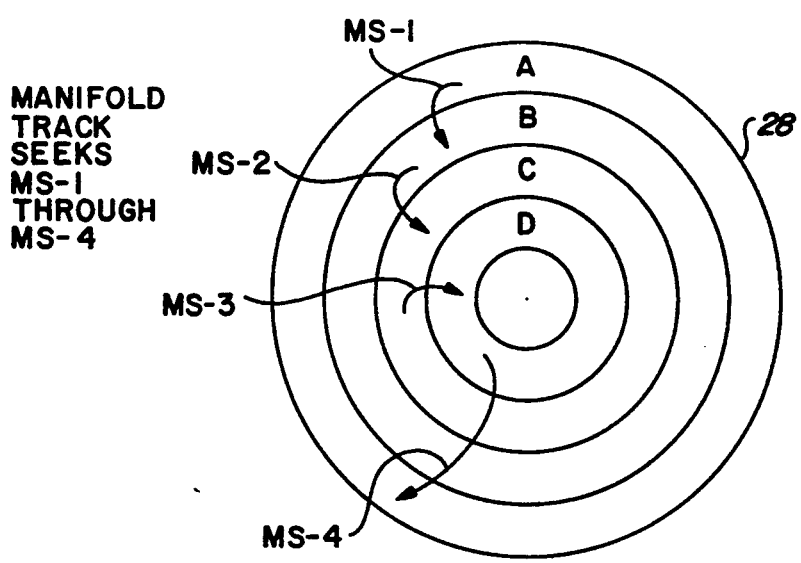
FIG. 5B is a diagrammatic showing of practicing the present invention in a single disk drive.

FIG. 5A diagrammatically illustrates the known cylinder mode scanning plus the extended cylinder mode scanning of the present invention. A cylinder of tracks are those tracks located at a same radial position on a disk. Most DASD employ "comb" head assemblies such that a head or transducer is operatively associated with each recording surface; then switching between scanning tracks in a given cylinder is achieved by electronic circuits which connect a single read-write circuit to any one of the heads. FIG. 5A shows three co-rotating co-axial disks 120, 125 and 130, each disk having two recording surfaces respectively 121, 122; 126, 127 and 131, 132. Each of the small rectangles 135 represents one circular data-storing track; all vertically aligned rectangles representing respective cylinders of tracks. In many DASD, one of the recording surfaces is prerecorded as a positioning servo surface, such as surface 132; therefore, the number of data-storing surfaces are always an odd number, such as five in FIG. 5A. The prior art cylinder mode provides for serially scanning all of the tracks in any one cylinder of tracks. For example, first a track at radial position 136 residing on surface 121 is scanned. Then, upon completing the scan on surface 121 electronic circuits (not shown) switch the read-write circuits (not shown) to scan a track in cylinder 136 on surface 122. Arrow 137 represents the serial track scanning in a cylinder 136 proceeding as above described to surface 126, thence surface 127. Arrow 138 represents the serial track scanning proceeding to a track of cylinder 136 on surface 131. In the prior art, scanning the surface 131 track completed the cylinder mode. Some programs then treated each cylinder of tracks as containing one logical track stored in all of the data-storing physical tracks in any one cylinder of tracks. According to the present invention, this useful concept is extended to a plurality of cylinders of tracks in a plurality of zoned data storing disks. Accordingly, the invention can be practiced wherein one cylinder of data is read from each of the plurality of devices as if the cylinder were one track. This mode is termed the extended cylinder mode. With plural track cylinders, the operation described for FIG. 2 in which a single track is read from each device may also be practiced; the formatting of the devices during recording determines which mode is used in reading data from the plurality of devices.

FIG. 5A also shows the previously described track manifolds A, B, C and D. There are ten cylinders of tracks in each of the manifolds A-D in the illustrated device. The FIGS. 2-4 illustrated continuous physical track scanning works well with cylinders of tracks. In FIG. 5A, upon completion of each cylinder mode scan, the scanning proceeds to a next cylinder of tracks in the same way that the previously described scanning proceeded from physical track to physical track in the same and different manifolds. After completely scanning the data-storing track of cylinder 13 on surface 131 (assume that surface 132 is a servo surface), arrow 139 indicates that the continuous scan proceeds to the same relative track in the zone B of a next drive, i.e. in manifold M1 the scan proceeds from DVE1 zone A to the first cylinder of zone B in DVE2. In FIG. 5A this relative position is the cylinder mode scan in zone B as represented by arrows 141 and 142. Upon completing this last mentioned cylinder mode scan, the continuous multi-cylinder scan proceeds, as represented by arrow 143, to a zone C of a next device; in M1 of FIG. 2 arrow 143 represents switching the continuous scan from DVE2 zone B to DVE3 zone C. The scanning proceeds as above described for all zones and as indicated by arrows 144-148 of FIG. 5A. Arrow 149 represents returning to zone A of the first device (DVE1 in M1) at a second or adjacent cylinder 151 of physical tracks. All of the above-described electronic track switching enables the continuous scan of a second set of cylinders in the manifold M1. All manifolds are scanned in a like manner. Numeral 160 designates cylinders of tracks on the illustrated device which are not assigned to any manifold; i.e. are accessed as in the prior art. Such non-manifold tracks can be physical data-storing tracks for control information, for storing shorter logical tracks, and the like. It should be remembered that one logical track can occupy all physical tracks in all manifolds in the plurality of devices, DVE1-DVE4. Of course, any number of manifolds and devices may be employed. It is preferred that the number of manifolds never be fewer than the number of devices. This preference extends to one device having one or more manifolds of tracks. In a one device embodiment, it is preferred that a plurality of comb heads be used otherwise performance is less than achievable with a plurality of devices. It is also preferred that the number of tracks/cylinders in each zone of the disks in a plurality of devices be the same, no limitation thereto intended. For example, in a four-zone single-device set up, two zones at the respective radial extremities may have a first number of tracks each while two zones disposed radially between the zones at the radial extremities may have twice the first number of tracks. In such an arrangement, the continuous scanning proceeds alternately in opposing radial directions on the disk. Other arrangements can also be envisioned.

Referring next to FIG. 6, array processor 11 includes a programmed control 61 operating on software stored in RAM 69. RAM 69 may be a read-only memory with the software embedded in semiconductor chips or may be writable RAM in which the software is either read from an external store (not shown, but can be a magnetic tape, optical or magnetic disk or diskette, and the like), downloaded from a host processor 10 over electronic connection 64 and the like. Controller 11 includes two data buffers, channel buffer 62 for buffering data transfers with host processors 10 and a device buffer 63 for buffering data transfers with devices 12–15. Cable 65 connects the two buffers for transferring data therebetween. In a practical embodiment, the two buffers 62 and 63 may be allocated portions of a subsystem storage (not shown), a relatively small rate changing buffer, separate buffers for each of the devices or one buffer shared by all of the devices 12–15. The selection of the buffer arrangement is independent of practicing the invention excepting that such buffer design can affect performance of the information handling system. Programmed control 61 has a separate connection 68 to device controllers 12–15 for controlling same; during data transfers the device controllers and buffers automatically transfer data while programmed control 61 monitors the data transfers. Numeral 36 designates the control connection to SYNC circuit 35 of FIG. 2.

FIG. 7 is a simplified machine operations chart for effecting the operations described for FIGS. 2–5. In one embodiment, as for all of the machine operations shown in FIGS. 7–11, programming in RAM 69 enables programmed control (a programmed processor) 61 to control the array controller 11, device controllers 12–15 (thus devices 20–27) to effect the illustrated machine operations. It is to be understood that such programmed control can be lodged in any unit of the information handling system of FIG. 1 including merging array controller 11 in a one or more of the host processors 11. Also portions of the programming control can be lodged in any of the device controllers 12–15; such device controllers can be packaged or lodged as part of one or more of the devices 20–27.

A first machine step for effecting the operations described for FIG. 2 includes step 70 for servoing (moving the heads [not shown] of the respective devices 20, 22, 24 and 26) to the same manifold and relative physical or real track. Referring to FIG. 5A, the heads of DVE1 are moved to scan tracks in cylinder 136 of zone A, the heads of DVE2 are moved to scan tracks in zone B of cylinder represented by arrow 141, the heads of DVE3 are moved to scan tracks in zone C of the cylinder represented by arrow 144 and the heads of DVE4 are moved to scan tracks in zone D as represented by arrow 147. Manifold M1 includes all tracks in the zones identified immediately above in the respective devices. Machine step 71 selects DVE1 as the first device of manifold M1 for accessing the logical track which includes the tracks in manifold M1. For a read operation, at machine step 72 data is read from the track in cylinder 136 on recording surface 121 into buffer 63. In effecting the extended cylinder mode, all tracks are read from cylinder 136 before reading tracks from DVE2; in the FIG. 2 illustrated mode, termed the extended track mode, after reading the surface 121 track, operations proceed directly to DVE2 as indicated by arrow 139 in FIG. 5A or arrow M1-1 of FIG. 2. At machine step 72, DVE1 is actuated to seek to the next radial track, as from cylinder 136 to cylinder 151 of FIG. 5A. This step corresponds to beginning the track seek or switch at numeral 31 of FIG. 3. Effectively simultaneously, at machine step 74 the next device to be read is selected for data transfer, such as DVE2. At machine step 75 the data to be read from DVE2 is transferred to buffer 63. Following the data transfer, at machine step 76, programmed control 61 determines whether or not the logical track being accessed has reached the end of the track. If yes, at operation path 77 machine operations under program control proceed to other operations. If the logical track has not been completely read, then machine steps 72 et seq are repeated until the complete logical track has been read (written to in a write operation). The FIG. 7 illustrated machine operations apply to any access of a logical track.

Before proceeding to describing the remaining figures, it is to be noted that the machine operations charts do not address the finer points of timing so well known in operating DASD. In many subsystems, only one device can be selected for performing an operation at one time, in other subsystems two devices can be simultaneously selected for performing an operations, in most subsystems each device can be actuated to perform a free standing operation (head seek/track switch) and then released, and in yet other subsystems two independent connections are provided to devices, one connection for actuating the free standing operations and a second connection for effecting data transfers and other control operations not performed in the one connection. Therefore, detailed descriptions of such timing considerations are dispensed with.

In a similar vein, determination of the end of a logical track at machine step 76 can follow any one of several techniques. A host processor 10 can indicate the logical track parameters; programmed control 61 monitors the data transfers and when the indicated parameters and the monitored data transfer parameters are equal, the host processor 10 commanded disk access operation has been completed. In another embodiment, during monitoring the data transfer, programmed control detects a marker embedded in the data indicating that no more data is available for transfer to determine an end of a logical track. A host processor 10 could command to read but a portion of a logical track, i.e. the data stored in DVE1 and DVE2 of manifold M1 which requires only reading data from those two devices. Each physical track can also be read independently as well. Other automatic mechanisms can also be employed.

FIG. 8 illustrates machine operations wherein all physical tracks of the devices are simultaneously read into or from a buffer 63. This operation is useful when the combined buffers 62–63 have a data-storing capacity equal to capacity of the summation of the data-storing capacities of one track from all of the devices DVE-1–DVE4 in one group. The description is for a read operation, the same set of operations with data transfers to the devices 12–15 are used for recording or writing data to the devices. Machine step 80 actuates all of the participating devices to move to the selected manifold, as described for machine step 70. Then at machine step 81, all devices are simultaneously read for transferring data into buffer 63. Then at machine step 82, all devices simultaneously seek their respective head(s) to a next track to access a next logical track portion. At machine step 83, the subsystem waits, if necessary, for the data transfer to a host processor 10 has been completed. As soon as the buffer to host transfer is completed, programmed control 61 at machine step 84 determines, as described above, whether the complete logical track or tracks have been read from the devices. If yes, then programmed control 62 follows operation path 85 to exit the disk access operation for performing other operations. If the requested transfer has not been completed, then steps 81-83 are repeated.

FIGS. 9 and 10 illustrate mode of operation determination as between the extended track mode, the extended cylinder mode and the individual track access mode (the latter is prior art mode of accessing). FIG. 9 illustrates a MODESET command indicating the type of operation. According to the invention, the known MODESET command is modified to include commanding reading in the extended track mode, extending cylinder mode and in any prior art mode. Such modification is merely adding new information coding to the existing command format. A MODESET command is received by array controller 11 from a host processor at machine step 90. The selected mode for devices 20-27 identified in the MODESET command is effective either for a current chain of commands, for a next occurring chain of commands or until changed by a subsequent MODESET command. The term "chain of commands" refers to the IBM control of peripheral devices by chaining peripheral commands. Programmed control 61 at machine step 91 sets the mode for the device(s) indicated in the MODESET command. After completing machine step 91, array controller awaits receipt of a disk access command from a host processor 10 for the devices specified in the MODESET command. This arrangement means that devices in one group may be operating in the extended track mode, devices in a second group operate in the extended cylinder mode and other devices in the subsystem operate as in the prior art. Upon receiving a disk access command (read, write, etc), programmed control 61 reads the received and stored set mode at step 92. If the mode is "ones", i.e. each device is individually accessed, then at machine step 93 array controller accesses the addressed device as in the prior art. Within the subsystem, such access is separate and independent from other disk accesses. If the mode is "group" then at machine step 94 a group of the devices 20-27 are accessed either in the extended track or extended cylinder modes.

The access mode may be implicitly or explicitly indicated in each disk access command. Of course, host processor 10 programming (not shown nor described) has to accommodate the formatting of data on the devices 20-27 to ensure reliable operation. In FIG. 10, a disk access command is received by array controller 11 from a host processor 10 at machine step 100. The character of the received command must indicate accessing one device (the ones mode of FIG. 9), accessing a logical track of a group or accessing an extended "cylinder" of a group. Addressing structure may be selected to implicitly indicate the mode; separate flags (not shown) in the access command may indicate the mode of access. At machine step 101, programmed control 11 examines the received disk access command as to whether or not a real or physical track of one device is to be accessed. If a logical track is to be access (step 101 has a NO answer), then group accessing as described herein is effected at machine step 102. If a real or physical track/cylinder is to be accessed (step 101 has a YES answer), then prior art single device accessing is effected at machine step 104. Upon completion of step 102 or 103, array controller awaits receipt of a next disk access command as indicated by arrow 104.

Writing a logical track of data using a group of devices is shown in FIG. 11. It is assumed that a disk access command has been received and decoded for executing a group write. For each group write, at first machine step 110 all devices are actuated to access the desired physical tracks of a desired manifold M1-M4. Data to be stored in the extended track or extended cylinder modes is received at machine step 111 from a host processor 10 and stored in buffer 62. Then the received data is transferred to buffer 63 for writing to the group of devices. At machine step 112 the received data is transferred from buffer 63 to the selected devices using either the subsystem procedures described with respect to FIGS. 7 or 8. At machine step 133, programmed control 61 determines whether or not the recording of data into a logical track has been completed (END=YES). If yes, programmed control 61 follows operation path 115 to exit the disk access command execution for performing other operations. If no. then more data is received from a host processor 10 at machine step 111.

While the invention has been particularly shown and described with reference to preferred embodiments thereof, it will be understood by those skilled in the art that various changes in form and details may be made therein without departing from the spirit and scope of the invention.

What is claimed is:

1. In apparatus for storing data in a plurality of spaced apart physical tracks in a first predetermined number of disk data storage devices, said first predetermined number being greater than unity, each said device having at least one rotatable data-storage disk; including, in combination:

each said device having one or more disk recording surfaces, each surface having a second predetermined number of recording zones, all of the recording zones having a like predetermined number of addressable data storing physical tracks, each physical track in each zone storing a like-number of data bytes, the physical tracks in different zones storing a different number of data bytes wherein a radially outwardmost zone has physical tracks storing a maximal number of data bytes and zones of decreasing radial positions respectively having physical tracks storing fewer data bytes; and manifold means connected to said each said device for establishing a given plurality of groups of predetermined ones of the physical tracks for enabling addressably-accessing each of said groups of physical tracks as one logical track, predetermined ones of the plurality of physical tracks in each of said given plurality of groups being in a plurality of the recording zones, said manifold means having a given plurality of manifold indicating means for establishing a plurality of manifolds of said groups of physical tracks, each of said established manifolds having logical tracks beginning in respective ones of said devices.

2. In the apparatus set forth in claim 1 further including, in combination:

said first predetermined number of devices being less than or equal to the second predetermined number of recording zones;

each of the physical tracks in each one of the logical tracks being in a different device; and all of said logical tracks having an equal data storing capacity.

3. In the apparatus set forth in claim 1 further including, in combination:

the manifold means having means indicating which of the physical tracks constitute each respective one of the logical tracks;

the indicating means identifying the radial position of each one of the zones in each of the first predetermined number of devices; and sequence means in the manifold means and connected to the indicating means for actuating the indicating means to indicate a radial outwardmost one of the zones in respective ones of the devices as containing a first physical track as a front-most portion of each of said logical tracks for being first accessed when reading an entirety of the respective logical tracks.

4. In the apparatus set forth in claim 1 further including, in combination:

each said device having a given plurality of disk co-axial co-rotating recording surfaces such that said given plurality of said tracks are disposed on respective ones of said given plurality of recording surfaces are at a same radius which constitutes a cylinder of tracks, said given plurality of transducers in each device respectively radially movably disposed with respect to the respective given plurality of recording surfaces, electronic means for switching to the transducers for scanning all tracks in a one of said cylinder of tracks; and said sequence means actuating each device to sequentially access all of the tracks in each given one of the cylinders of tracks before accessing tracks in a different cylinder of tracks.

5. In the apparatus set forth in claim 4 further including, in combination:

said sequence means having manifold switching means for effecting a continuous serial scan of said logical tracks in a first one of the manifolds and continuing the continuous scanning of said logical tracks in a second one of the manifolds without interruption of the scanning; and indicating means connected to the sequence means for actuating the sequence means to switch scanning said logical tracks in said first one of the manifolds to begin scanning said logical tracks in said second one of the manifolds.

6. In the apparatus set forth in claim 1 further including, in combination:

said sequence means including initial means connected to all of the devices for actuating said devices to prepare to access a predetermined ones of said physical tracks in respective ones of the zones, each device being actuated to access a said predetermined ones of said physical tracks of a zone having a radial position different from any track being access by any other of said devices.

7. In the apparatus set forth in claim 6 further including, in combination:

sync means connected to all of said devices for actuating same to rotate the respective data storage disk in the devices at the same rotational speed.

8. In the apparatus set forth in claim 7 further including, in combination:

each disk having an index mark;

said sync means having phase means for actuating all of said devices to rotate the respective disks such that each index mark of all of the disks are scanned substantially simultaneously.

9. In the apparatus set forth in claim 1 further including, in combination:

each of said logical tracks including one physical track from each of said devices; and each physical track in each logical track being disposed in a zone having a radius different from every other physical track in said each logical track.

10. In the apparatus set forth in claim 1 further including, in combination:

data access control means connected to the sequence means for actuating the sequence means to access a logical track as a first mode of operation and having mode means indicating a second mode of operation; and physical track accessing means connected to the data access control means for accessing any one of the physical tracks as said second mode of operation.

11. In the apparatus set forth in claim 10 further including, in combination:

format means in the manifold means for establishing a predetermined number of the physical tracks in each said device which are not a member of any of said logical tracks.

12. In the apparatus set forth in claim 1 further including, in combination:

said given plurality being equal to said first predetermined number, each of said respective logical tracks including a physical track in each of said devices in respective ones of the zones and wherein each of said zones in the respective devices being at respective different radii from radii of all other zones in which said physical tracks of each logical track.

13. In the apparatus set forth in claim 12 further including, in combination:

said manifold means further indicating that each of the logical tracks begins in said radially outwardmost zone in each of the respective devices; and said first and second predetermined numbers being equal in value.

14. In the apparatus set forth in claim 13 further including, in combination:

computer means connected to all of said devices;

said computer means including an array controller means including said sequence means, said manifold means, said zone indicating means; and a device controller means for each of said devices for responding to said sequence means to actuate the respective devices to access a plurality of said physical tracks, respectively in different ones of said zones.

15. In the apparatus set forth in claim 14 further including, in combination:

mode control means in the computer means for actuating the sequence means to activate respective ones of the device controller means in a first mode to access a plurality of said physical tracks in respective ones of the devices as a logical track and in a second mode to access any one of said physical tracks in a predetermined one of the devices independently of any of said logical tracks.

16. In the apparatus set forth in claim 14 further including, in combination:

each of said device controller means being connected to a plurality of said devices;

grouping means in the manifold means and to the zone indicating means for indicating a plurality of groups of said devices corresponding to said groups of physical tracks, respectively.

17. In the apparatus set forth in claim 15 further including, in combination:

said mode control means having mode set means for selecting either said first or second mode of operations for a predetermined ones of said accesses.

18. In the apparatus set forth in claim 15 further including, in combination:

said mode control means having access request means for indicating a given access to any of said devices is in said first or second mode of operation for each of said accesses.

19. In a machine-effected method of accessing any one of a plurality of physical data-storing tracks in any one of a first predetermined number of devices, said first predetermined number being greater than unity, each of the devices including a rotatable data-storing disk, each disk having a second predetermined number greater than unity of radial recording zones of said physical data-storing tracks on the disk, said physical tracks in respective one of the recording zones having a different data-storage capacity with a radial outwardmost one of the recording zones having a maximal data-storing capacity, including the machine-executed steps of:

establishing a given plurality of groups of predetermined ones of the physical tracks as one logical track for enabling addressably-accessing any of said groups of physical tracks as one logical track, assigning one of the plurality of physical tracks in respective ones of a predetermined plurality of the recording zones to be in predetermined ones of said given groups; and in said establishing step, selecting respective physical tracks from each of each devices to begin respective ones of said logical tracks including selecting a like number of said respective physical tracks from each of said devices.

20. In the machine-effected method set forth in claim 19 further including the machine-executed steps of:

making said first predetermined number of devices to be less than or equal to the second predetermined number of recording zones;

assigning each of the physical tracks in each one of the logical tracks to be in a different one of said devices; and in said establishing step, selecting said given plurality of said logical tracks to have equal data storing capacities including selecting all of the physical tracks beginning in respective ones of the devices to include physical tracks in the respective devices from one of said zones including selecting a zone from each of the devices for the logical tracks having a different radius from any zone of any other of the devices that includes a physical track in the respective logical track.

21. In the machine-effected method set forth in claim 19 further including the machine-executed steps of:

indicating which of the physical tracks constitute each respective one of the logical tracks; and identifying the radial position of each one of the recording zones in each of the first predetermined number of devices; and indicating that a radial outwardmost one of the recording zones as containing a first physical track as a frontmost portion to be first accessed when reading an entirety of the respective logical track.

22. In the machine-effected method set forth in claim 19 further including the machine-executed steps of:

in each said device providing a given plurality of disk co-axial co-rotating recording surfaces such that said given plurality of said tracks are disposed on respective ones of said given plurality of recording surfaces are at a same radius which constitutes a cylinder of tracks, providing a given plurality of transducers in each device respectively radially movably disposed with respect to the respective given plurality of recording surfaces, electronically switching the transducers for scanning all tracks in a one of said cylinder of tracks; and actuating each device to sequentially access all of the tracks in each given one of the cylinders of tracks before accessing tracks in a different cylinder of tracks.

23. In the machine-effected method set forth in claim 19 further including the machine-executed steps of:

establishing a predetermined plurality of manifolds of the logical tracks, including for each of the manifolds selecting a plurality of physical tracks from the physical tracks in one of the recording zones of each of said devices and wherein the recording zones of different ones of the manifolds to include physical tracks from recording zones in each device having a different radial position on the respective data-storing disks of such devices and wherein all of the logical tracks in the respective manifolds begin in a different one of said devices;

switching between accessing said physical tracks in a first one of the manifolds to a second one of the manifolds for effecting a continuous serial scan of said tracks in a first one of the manifolds and continue the continuous scanning of said tracks in a second one of the manifolds without interruption of the scanning.

24. In the machine-effected method set forth in claim 19 further including the machine-executed steps of:

actuating said devices to prepare to access a predetermined track in respective ones of the recording zones, actuating each of the devices to respectively access a track of a recording zone having a radial position different from any track being accessed by any other of said devices.

25. In the machine-effected method set forth in claim 24 further including the machine-executed steps of:

synchronizing disk rotation in all of said devices to rotate at the same rotational speed.

26. In the machine-effected method set forth in claim 24 wherein each disk has an index mark, further including the machine-executed steps of:

actuating all of said devices to rotate the respective disks such that each index mark of all of the disks are scanned substantially simultaneously.

27. In the machine-effected method set forth in claim 19 further including the machine-executed steps of:

establishing first and second modes of accessing said physical tracks in each of said devices;

in the first mode accessing a plurality of said physical tracks as a said logical track; and in the second mode accessing each of the physical tracks independently.

28. In the machine-effected method set forth in claim 19 further including the machine-executed steps of:
  establishing each of a plurality of said devices to have a given number of physical tracks; and
  in said establishing step, establishing less than all of said given number of tracks to be in any of said logical tracks.

29. In the machine-effected method set forth in claim 19 further including the machine-executed steps of:
  establishing a third predetermined number of manifold indications, each of the manifold indications indicating respectively logical tracks beginning in respective ones of said devices and each of said respective logical tracks including a physical track in each device and in respective ones of the recording zones in the respective devices;
  indicating that each of the logical tracks begins in a predetermined one of said recording zones in each of the respective devices; and
  making said first predetermined number equal to said second predetermined number.

30. In the machine-executed method set forth in claim 29, further including the machine-executed steps of:
  establishing each of the manifolds of logical track to begin with a physical track in the respective radially outwardmost recording zones of all of said devices.

31. In the machine-executed method set forth in claim 23, including the machine executed steps of:
  establishing all of said manifolds of logical tracks to begin in a radially outwardmost one of the recording zones in the respective devices; and
  establishing said first and second predetermined numbers to be equal whereby the number of devices equals the number of zones.

* * * * *

UNITED STATES PATENT AND TRADEMARK OFFICE
CERTIFICATE OF CORRECTION

PATENT NO. : 5,202,799
DATED : April 13, 1993
INVENTOR(S) : Hetzler, Menon, Mitoma It is certified that error appears in the above-identified patent and that said Letters Patent is hereby corrected as shown below:

Column 3, line 2, delete "ar" add --are--

Column 8, line 27 after "track of cylinder, delete 13 add --136--

Signed and Sealed this

Eleventh Day of January, 1994

Attest:

BRUCE LEHMAN

Attesting Officer    Commissioner of Patents and Trademarks